United States Patent [19]

Keller et al.

[11] 4,145,595
[45] Mar. 20, 1979

[54] GAS SHIELDED ARC-WELDING TORCH

[75] Inventors: Klaus Keller, Nissequoque; Erich Keller, Smithtown, both of N.Y.

[73] Assignee: Welding Nozzle Incorporated, Farmingdale, N.Y.

[21] Appl. No.: 920,181

[22] Filed: Jun. 29, 1978

[51] Int. Cl.² .............................................. B23K 9/16
[52] U.S. Cl. ................................ 219/75; 219/137.51; 219/137.9
[58] Field of Search ...................... 219/137.51, 74, 75, 219/137.9, 121 P, 137.63; 138/174

[56] References Cited

U.S. PATENT DOCUMENTS

| 2,547,872 | 4/1951 | Kissick | 219/75 |
| 2,555,017 | 5/1951 | Tuthill | 219/75 |
| 2,943,183 | 6/1960 | Simms et al. | 219/75 |
| 3,169,552 | 2/1965 | Fawick | 138/174 |
| 3,703,622 | 11/1972 | Kleppen | 219/75 |
| 4,049,943 | 9/1977 | Pratt | 219/137.63 |

Primary Examiner—J. V. Truhe
Attorney, Agent, or Firm—Michael Ebert

[57] ABSTRACT

A gas-shielded arc-welding torch constituted by a holder section having a barrel adapted to retain a tungsten electrode and a handle section which supplies electric current to the holder section as well as an inert gas thereto, the holder section being bendable relative to the handle to assume any desired angular working position. Included in the handle section is a conductive metal helix of solid wire, one end of which is connected by a tubular metal coupler to the barrel of the holder section, the other end being connected by a pipe to a hollow electrical connector to define a current-supply line extending from the connector to the barrel. The coupler, the helix and the pipe are embedded in a torch body formed of elastomeric material, the body having a bore therein passing through the helix to join the pipe to the coupler and thereby define a gas supply conduit extending from the connector to the coupler which in turn communicates with the interior of the barrel to feed the gas into the region surrounding the electrode. The lower portion of the torch body and the connector are inserted within a handle, whereas the upper portion of the body which surrounds the upper portion of the helix is of reduced diameter to form therewith a flexible neck which permits bending of the holder section relative to the handle.

6 Claims, 5 Drawing Figures

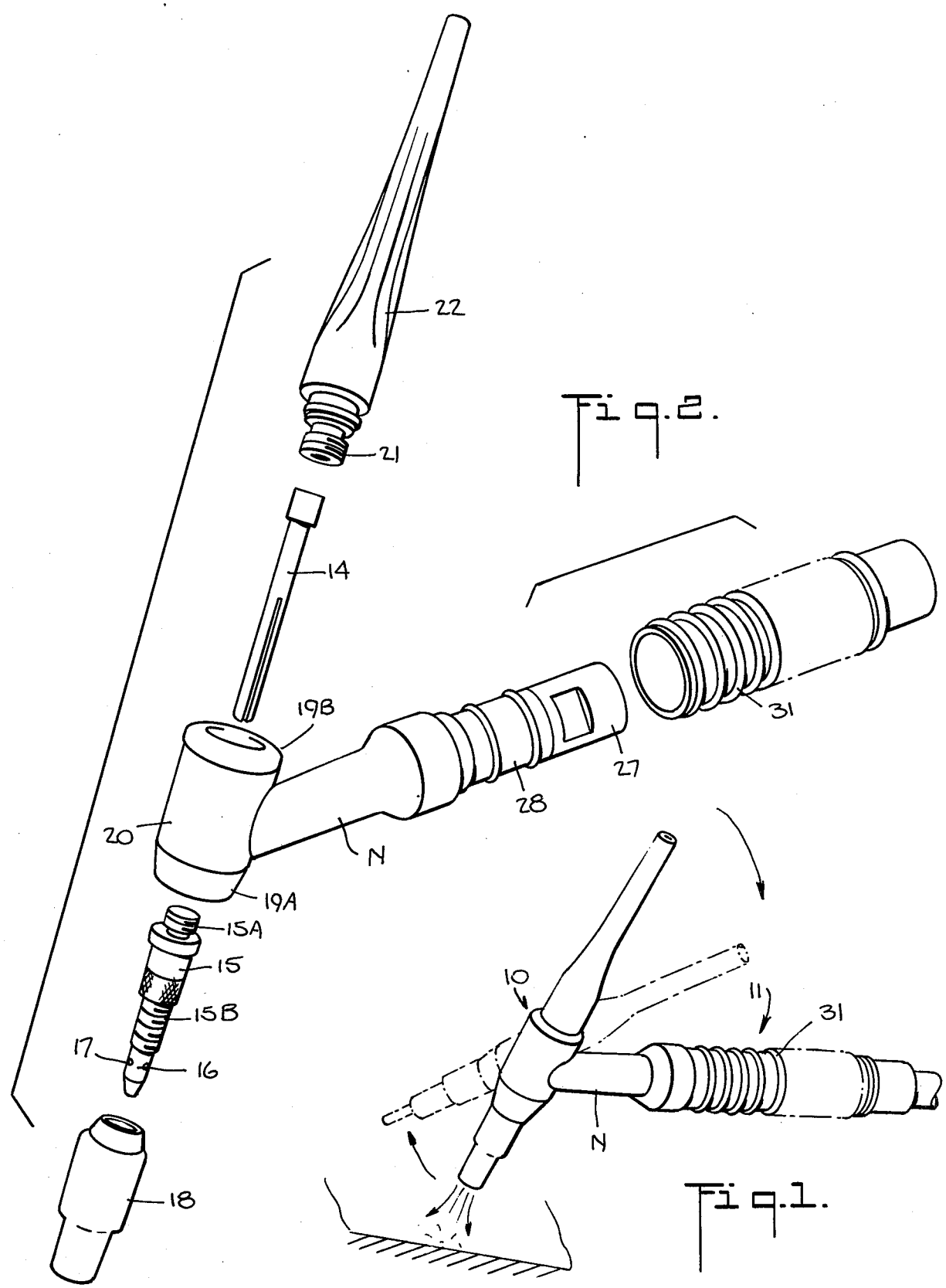

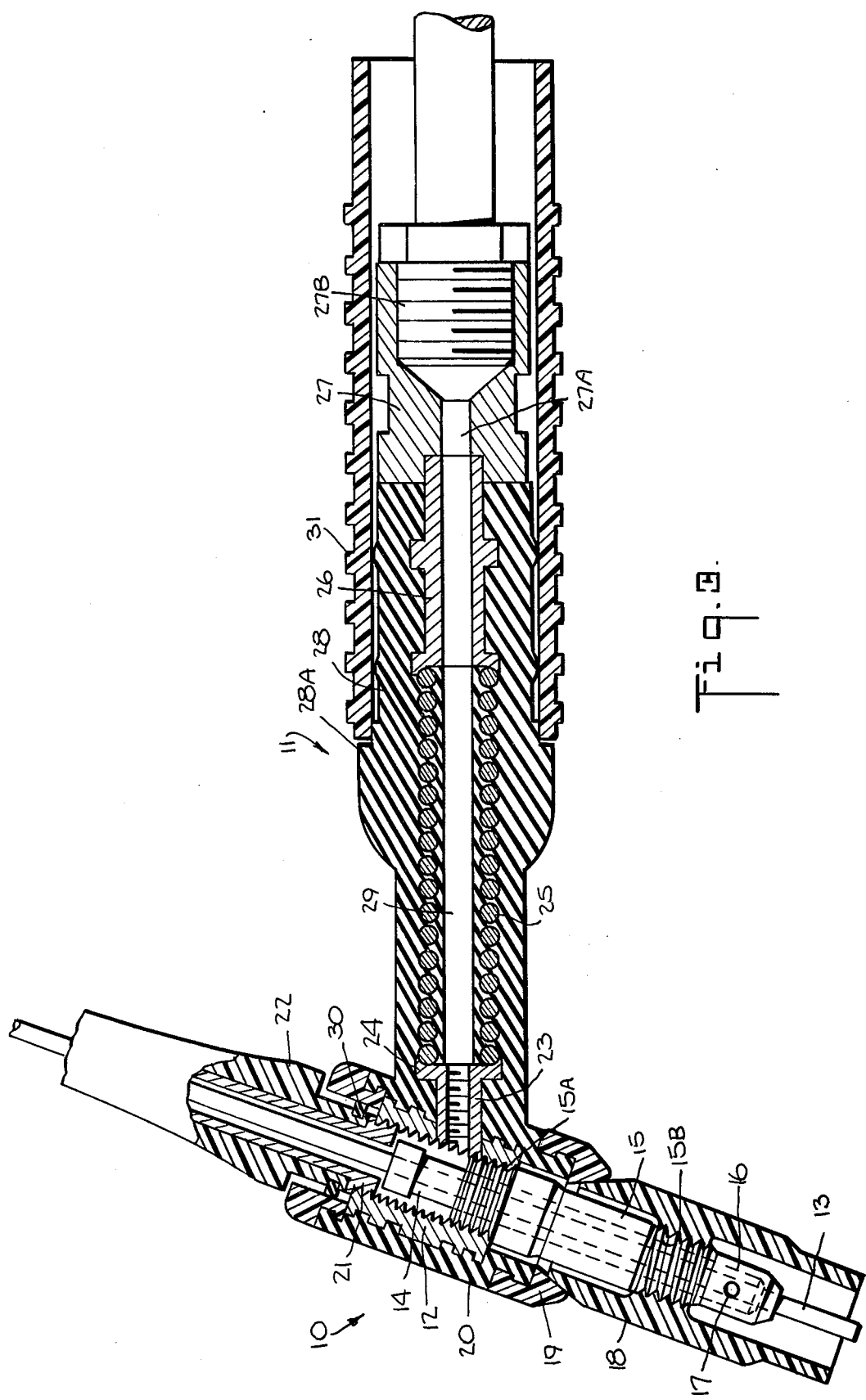

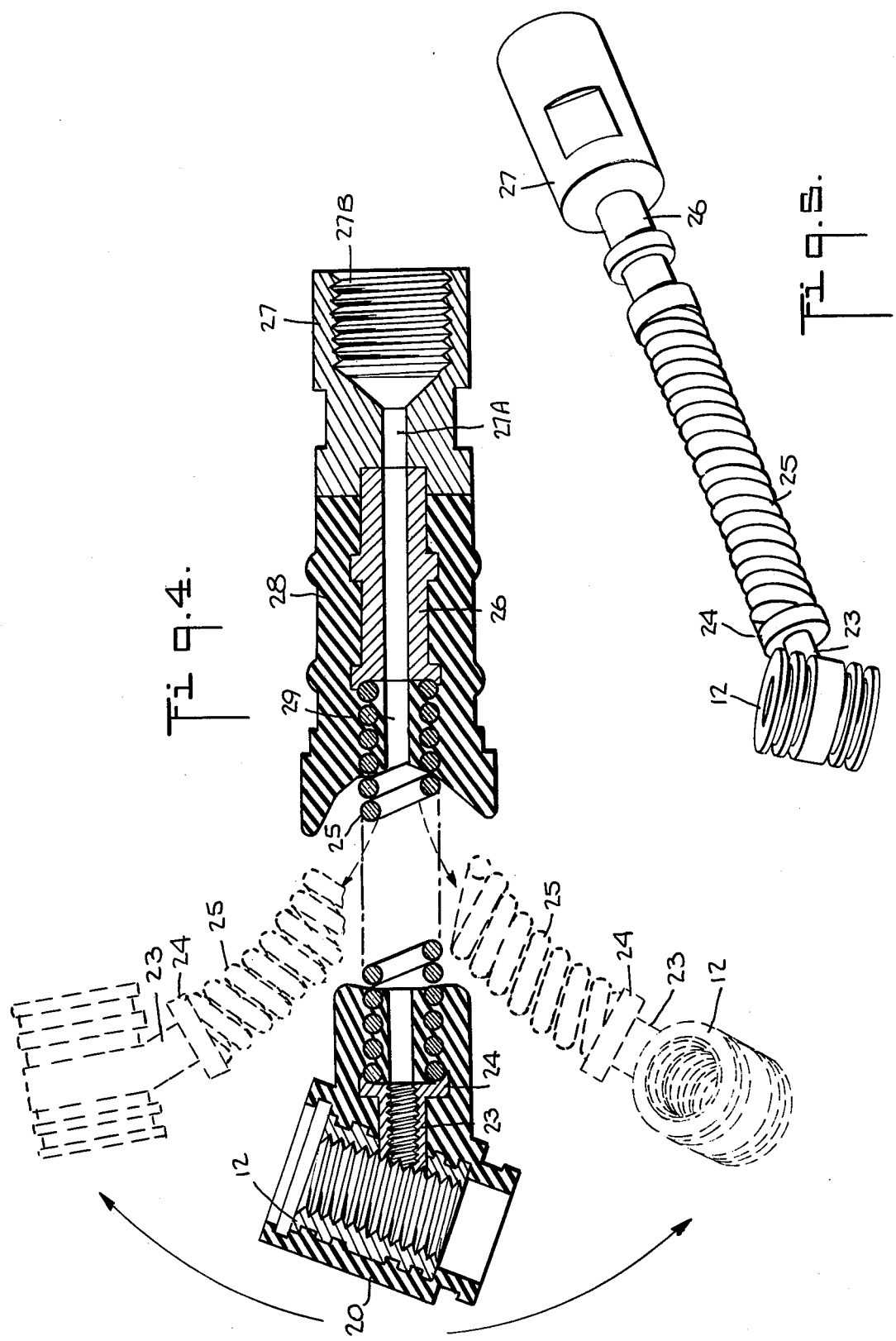

GAS SHIELDED ARC-WELDING TORCH

BACKGROUND OF INVENTION

This invention relates generally to hand-held metal arc-welding torches, and more particularly to a gas-shielded torch adapted to hold a tungsten electrode and to supply welding current to the electrode as well as an inert gas to the region surrounding the electrode, the torch having an electrode having an electrode holder section which is bendable with respect to a handle to assume any desired angular working position.

The term "fusion welding" is applied to processes in which metal pieces formed of aluminum, stainless steel, bronze, brass and other alloys are heated to a temperature at which they melt and are then joined without hammering or the application of pressure. Arc welding is the most important and widely employed fusion welding technique, such welding making use of an electric arc to melt the parent metal and the filler metal.

In one commonly used arc-welding technique, the arc is established between a consumable electrode and the workpiece, the electrode gradually melting away to supply the filler metal. The broad concern of the present invention is with arc-welding torches making use of a non-consumable electrode of tungsten which has a relatively high melting point. In practice, the tungsten electrode is actually dissipated at a very slow rate and must therefore ultimately be replaced.

The particular concern of the present invention is with gas-shielded arc welding torches which protect the welding zone from the atmosphere with an envelope of a chemically inert gas. This gas may be helium (heliaric process), argon (argonaric process) or carbon dioxide. With very heavy welding currents, it also may be necessary to supply cooling water to the tungsten electrode, and for this purpose the torch must have water inlet and outlet lines.

To afford greater maneuverability for gas-shielded arc-welding torches, it is now common practice to retain the tungsten electrode in a holder which is angled with respect to the handle. Since a fixed angle limits the utility of the torch, various expedients are now provided to permit adjustment of the angle between the electrode holder and the handle therefor, while maintaining the supply of electric current and inert gas thereto.

One approach making it possible to adjust the angle of the electrode holder relative to the handle of an arc-welding torch is disclosed in the Kissick U.S. Pat. No. 2,547,872 in which use is made of a hinge to permit the desired angular adjustment. In order to supply an inert gas as well as cooling water to the hinged electrode holder, the Kissick torch includes flexible gas and water lines formed of rubber. The disadvantage of the Kissick arrangement is that it often results in leakage of gas and water from the lines at their clamped joints. Moreover, the heat generated in welding tends to dessicate and ultimately crack the rubber lines.

An alternative approach to supplying both electrical current and an inert gas to an electrode holder which is bendable relative to the handle of the torch is disclosed in the Tuthill U.S. Pat. No. 2,555,017 where use is made of a deformable copper tube for this purpose, the tube being covered by a heat-resistant flexible sheath. While this tube in conjunction with the sheath makes it possible to bend the electrode holder to cause it to assume and retain a desired angular position relative to the handle through which the tube extends, it has a serious drawback; for with repeated bending, the copper tube undergoes work-hardening and breaks.

A similar approach is taken in the Simms et al. U.S. Pat. No. 2,943,183 in which the tungsten electrode holder is supplied with an inert gas by means of an inner helix of tubular metal such as copper piping and is supplied with cooling water by means of a concentric double helix of similar tubular metal, both helices being surrounded by a flexible sheath.

The reason why tubular metal lines of the type disclosed by the Tuthill and Simms et al. patents have a limited life is not only because of the work-hardening and embrittlement of the metal lines which takes place with repeated bendings, but also because of the distortion in the cross-section form of the bendable tubes which occurs when the metal tube is bent.

In the context of an arc-welding torch, a flexible metal pipe which serves both to conduct electric current and to conduct an inert gas must have a diameter sufficient to carry the desired flow of gas, and must also have a sufficient mass of metal to transfer the heavy flow of electric current. The larger the diameter of the metal tube, the greater is its mechanical stiffness, for a tube behaves in the manner of a structural beam. Thus a solid metal wire having a metal mass providing the same current-carrying capacity as a tubular conductor would have a substantially smaller diameter and be much less stiff. Hence this solid wire is much less resistant to bending and requires less manual force to bend.

In bending a tubular conductor, the conductor is subjected at its top or hoop side to a relatively high tensile stress and at its bottom side to a corresponding compression. With repeated bendings, these stresses are reversed from side to side, and work hardening and embrittlement occurs after a fairly small number of bending actions.

SUMMARY OF INVENTION

In view of the foregoing, the main object of this invention is to provide a gas-shielded arc-welding torch having an electrode holder which is bendable with respect to a handle to assume a desired angular position to facilitate arc-welding operations, which bending may be carried a greater number of times without work-hardening and failure of the metal helix which supplies current to the electrode.

More particularly, it is an object of this invention to provide a torch of the above-type which makes use of a helix of solid wire to conduct a heavy welding current to the electrode, gas being supplied to the electrode through a conduit which includes a bore formed in an elastomeric torch body in which the helix is embedded.

Also an object of the invention is to provide a low-cost and light-weight torch adapted for comfortable use for welding various types of joints and corners which otherwise would be inaccessible to conventional non-bendable electrode holders.

Briefly stated, these objects are attained in a gas-shielded arc welding torch constituted by a holder section having a barrel adapted to retain a tungsten electrode and a handle section which supplies electric current to the holder section as well as an inert gas to the region surrounding the electrode, the holder section being bendable relative to the handle whereby the electrode is caused to assume a desired angular position to facilitate welding operations.

Included in the handle section of the torch is a metal helix of solid wire, one end of which is connected by a tubular metal coupler to the barrel of the holder section, the other end being connected by a metal pipe to a hollow electrical connector to define a current supply line extending from the connector to the barrel, whereby current from a welding-current source may be supplied to the electrode retained in the barrel by a cable coupled to the connector.

The coupler, the helix and the pipe are embedded in a torch body formed of elastomeric material. The body has a bore therein passing through the helix to join the pipe to the coupler and thereby define a gas supply conduit extending from the hollow connector to the coupler which, in turn, communicates with the interior of the barrel to supply the gas to the region surrounding the electrode. The lower portion of the torch body below a shoulder formed thereon and the connector are encased within a hollow handle, whereas the upper portion of the body above the shoulder which surrounds the upper portion of the helix is of reduced diameter to form therewith a flexible neck which permits bending of the holder section relative to the handle.

OUTLINE OF DRAWINGS

For a better understanding of the invention as well as other objects and further features thereof, reference is made to the following detailed description to be read in conjunction with the accompanying drawings, wherein:

FIG. 1 is a perspective view of a preferred embodiment of an arc-welding torch in accordance with the invention;

FIG. 2 shows the torch in the dismantled state without the electrode;

FIG. 3 is a sectional view of the torch sub-assembly;

FIG. 4 illustrates the flexible neck of the torch which is shown in three different angular positions; and FIG. 5 is a perspective view of the helix.

DESCRIPTION OF INVENTION

Referring now to the drawings, there is illustrated a gas-shielded arc-welding gun or torch in accordance with the invention, the torch being constituted by a holder section and a handle section generally designated by numerals 10 and 11, respectively.

Holder section 10 includes an internally-threaded barrel 12 of copper or other highly-conductive metal for retaining a rod-shaped tungsten electrode 13. Electrode 13 is coaxially supported with respect to barrel 12 by means of a collet assembly formed by a tubular inner sleeve 14 having longitudinal slots to define spring fingers which clamp onto the electrode rod, the sleeve being inserted within a collet 15 whose externally-threaded read end 15A is received within the forward end of barrel 12. Collet 15 is provided with a nose projection 16 having a circumferential array of holes 17 therein to emit gas introduced into the annular space between sleeve 14 and the collet 15.

The portion 15B of collet 15 adjacent nose projection 16 is externally threaded to engage the internally-threaded nozzle 18 of a temperature-resistant ceramic material. The rear of nozzle 18 is tapered to nest within an insulating collar 19A having a complementary taper that snaps onto the forward end of a cylindrical insulating jacket 20 surrounding barrel 12, jacket 20 being molded of elastomeric material.

A second insulating collar 19B snaps onto the rear end of jacket 20. Extending through collar 20 and screwed into the rear end of barrel 12 is the tubular stem 21 of a pen-shaped hollow cap 22 into which the rear portion of the electrode rod 13 is inserted. A seal between collar 20 and stem 21 is effected by "O" ring 30.

Barrel 12 of the holder section is joined to the handle section 11 by means of a tubular metal coupler 23 which is internally threaded and extends laterally from the barrel at an angle thereto. Coupler 23 is formed of a highly conductive metal and communicates with the interior of the barrel to which it is welded. Coupler 23 is provided with a rear flange 24 which is brazed to the end of a double helix 25 formed by a pair of side-by-side coils of solid wire formed of copper or any other flexible metal or alloy of high conductivity and mechanical strength. The gauge of the wire is appropriate to the intensity of electric welding current for which the torch is designed.

The advantage of a double helix for carrying the heavy welding current as against a single helix of a solid wire is that the single helix providing a single conductive path for a given current-carrying capacity would have to have a substantially greater diameter than the diameters of a pair of solid wires forming two parallel paths for the same current. The single wire helix would therefore be more difficult to bend than the smaller diameter wires of a double helix.

The other end of double helix 25 is welded to the front end of a highly-conductive metal pipe 26 whose rear end is joined to a cylindrical connector 27. The outer diameter of connector 27 is greater than that of pipe 26, connector 27 having in its forward portion an internal bore 27A whose diameter matches the internal diameter of pipe 26 which is about the same as that of coupler 23. The rear portion of connector 27 has a bore 27B of larger diameter and is externally threaded to accommodate a cable coupler for connecting the torch to a source of welding current as well as to a pressurized source of inert gas.

Molded about coupler 23, double helix 25 and pipe 26 and embedding these components is a cylindrical body 28 formed of elastomeric insulating material such as silicon rubber. Body 28 is provided with a longitudinal bore 29 which joins coupler 23 to pipe 26 to define a gas flow conduit which extends from connector 27 to coupler 23 which in turn communicates with the interior of the barrel 12 to supply shielding gas thereto. This gas is emitted from holes 18 in the nose of the collet 15, the gas being projected through nozzle 18 to envelop the welding zone.

In fabricating the torch body, the sub-assembly shown by FIG. 5, which is formed by barrel 12, coupler 23, helix 25 and pipe 26, is placed in a mold into which a silicon rubber molding compound is injected to form the molded body, which body also surrounds barrel 12 to define jacket 20 as well as embedding the other components of the sub-assembly.

In order to create bore 29, helix 25, prior to the molding operation, is expanded to develop spaces between the convolutions thereof through which the molding compound is free to protrude. A tungsten rod or mandrel having a threaded end is inserted through the helix, the threaded end of the rod being screwed into coupler 23 which is internally-threaded to receive this end. After the silicon rubber is cured, the rod is removed, thereby defining bore 29 in the molded torch body surrounding the helix.

The upper portion of body 28 surrounding the corresponding portion of helix 25 is of reduced diameter to form therewith a flexible neck N which permits bending of the holder section relative to the handle section. At a point of greater diameter below the neck, body 28 is provided with a shoulder 28A, the lower portion of the torch body and connector 27 being encased in a tubular handle 31 whose front end abuts this shoulder.

Since the elastomeric rubber of body 28 is interposed between and adhered to the convolutions of double helix 25, when neck N is bent in a given direction the upper course of the convolutions which then spread apart act to stretch the rubber, whereas the lower course of the convolutions which then draw together act to compress the rubber, thereby limiting the displacement of the metal coils and minimizing work hardening of the helix. This serves to prolong the effective life thereof.

Because the helix is embedded in and cushioned by an elastomeric material, it is also feasible to make the double helix of tubular rather than solid wire, this being useful when it is necessary to supply a cooling liquid for the torch through the helix. In this case, one coil of the double helix serves as a flow inlet and the other as a flow outlet, the central bore 29 in the body 28 still providing a passage for the supply of shielding gas.

While there has been shown and described a preferred embodiment of a gas shielded arc-welding torch in accordance with the invention, it will be appreciated that many changes and modifications may be made therein without, however, departing from the essential spirit thereof.

We claim:

1. A gas-shielded arc welding torch provided with a holder section having a barrel adapted to retain a tungsten electrode rod, and a handle section which supplies electric current to the rod through the barrel as well as an inert gas to the region surrounding the exposed end of the rod, the holder section being bendable relative to the handle section, said handle section comprising:
    (A) a helix formed of a highly-conductive metal and having front and rear terminals;
    (B) a tubular metal coupler attached at one end to said barrel, said coupler extending laterally from the barrel and communicating therewith, the other end of the coupler being connected to the front terminal of the helix whose rear terminal is connected to one end of a metal pipe;
    (C) a hollow electrical connector attached to the other end of the pipe to define a current-supply line extending from the connector to the barrel whereby current from a welding-current source may be supplied to the rod retained by the barrel by a cable coupled to the connector; and
    (D) a body of elastomeric material molded about said coupler, said helix and said pipe, the convolutions of said helix being spread apart to admit said material, whereby said helix is embedded in said body, said body having a central bore therein passing through the helix and joining the pipe to the coupler to define a gas supply conduit extending from the hollow connector into the interior of the barrel, the front portion of the body which surrounds the corresponding portion of the helix forming therewith a flexible neck which permits bending thereof.

2. A torch as set forth in claim 1, wherein said electrode rod is coaxially supported with respect to the barrel by a collet assembly formed by a tubular inner sleeve which resiliently clamps onto said rod and a collet provided with a nose projection having holes therein to emit said gas admitted into the barrel and passing into the space between said sleeve and said collet.

3. A torch as set forth in claim 2, further including a nozzle secured to said collet to surround the tip of the rod.

4. A torch as set forth in claim 1, wherein said helix is formed of solid wire.

5. A torch as set forth in claim 1, wherein said helix is a double helix composed of two coils in side-by-side relation.

6. A torch as set forth in claim 1, wherein the portion of the torch body below a shoulder formed therein adjacent the neck is encased within a hollow handle.

* * * * *